(12) United States Patent
Stufflebeam

(10) Patent No.: US 6,240,522 B1
(45) Date of Patent: May 29, 2001

(54) CLOCK RUN CONTROLLER

(75) Inventor: Ken Stufflebeam, Spring, TX (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/164,149

(22) Filed: Sep. 30, 1998

(51) Int. Cl.[7] .................... G06F 13/00; G06F 1/26
(52) U.S. Cl. .......................... 713/324; 710/129
(58) Field of Search .................. 713/300–340; 710/126–130

(56) References Cited

U.S. PATENT DOCUMENTS

| | | | | |
|---|---|---|---|---|
| 5,765,002 | * | 6/1998 | Garner et al. ..................... | 713/300 |
| 5,890,004 | * | 3/1999 | Poisner ............................. | 713/300 |
| 5,905,901 | * | 5/1999 | Klein ................................ | 713/324 |
| 5,925,134 | * | 7/1999 | Solomon ........................... | 713/324 |
| 6,014,751 | * | 1/2000 | Kardach et al. .................. | 713/324 |
| 6,018,803 | * | 1/2000 | Kardach ........................... | 713/323 |
| 6,052,793 | * | 4/2000 | Mermelstein .................... | 713/340 |
| 6,065,121 | * | 5/2000 | Hobson et al. ................... | 713/300 |
| 6,065,122 | * | 5/2000 | Wunderlich et al. ............ | 713/320 |
| 6,125,449 | * | 9/2000 | Taylor et al. .................... | 713/310 |

OTHER PUBLICATIONS

"PCI Mobile Design Guide", PCI Local BUS, Oct. 27, 1994, Rev. 1.0, 52 pages.

* cited by examiner

Primary Examiner—David A. Wiley
(74) Attorney, Agent, or Firm—Conley, Rose & Tayon, P.C.

(57) ABSTRACT

A PCI bus controller which operates according to the PCI clock run protocol, without the complexity of a typical PCI bridge. This provides the power savings of Mobile PCI Clock run without the overhead, cost and complexity of a PCI to PCI bridge. This is accomplished by supplying a clock run controller, which sits on between the upstream PCI bus and a downstream PCI device, monitors traffic on the bus to determine if the PCI device is being actively accessed. If not, the clock to the PCI device is controlled according to the clock run protocol.

20 Claims, 3 Drawing Sheets

CLOCK RUN CONTROLLER

BACKGROUND AND SUMMARY OF THE INVENTION

This application related to computer system power management, and more particularly to power management in portable computer systems.

Background: PCI Bus

PCI, or Peripheral Component Interconnect, is a standard for interconnecting the peripherals, e.g. cards which are plugged into the motherboard) with both the system memory and the CPU of a computer system. Full technical details may be found in the *PCI Local Bus Specification* 2.1 (PCI SIG, 1995), which is hereby incorporated by reference. It was designed from the start to alleviate many of the headaches that installation of a new card into an ISA bus-based computer would cause (IRQ conflicts, address conflicts, etc.). All PCI standards are set by a committee to ensure wide industry support. The PCI Bus is described in detail below.

Background: PCI Bridge

Overview and Terminology

A PCI to PCI (P2P) bridge provides a connection path between two independent PCI busses. The primary function of the bridge is to increase "load out" on the PCI bus. Because the PCI bus driver is limited as to how many devices it can drive on a single bus, a P2P bridge is used to allow more loads (devices) to be used on the system. The P2P birdge then manages transactions between a master on one PCI bus and a target on the other PCI bus. PCI to PCI bridges provide system and option card designers the ability to overcome electrical loading limits by creating hierarchical PCI busses. To aid in the discussion of PCI to PCI bridge architecture the following terminology is used:

initiating bus—the master of a transaction that crosses a PCI to PCI bridge is said to reside on the initiating bus.

target bus—the target of a transaction that crosses a PCI to PCI bridge is said to reside on the target bus.

primary interface—the PCI interface of the PCI to PCI bridge that is connected to the PCI bus nearest to the CPU is referred to as the primary PCI interface.

secondary interface—the PCI interface of the PCI to PCI bridge that is connected to the PCI bus farthest from the CPU is referred to as the secondary PCI interface.

downstream—transactions that are forwarded from the primary interface to secondary interface of a PCI to PCI bridge are said to be flowing downstream.

upstream—transactions that are forwarded from the secondary interface to primary interface of a PCI to PCI bridge are said to be flowing upstream.

Thus, a PCI to PCI bridge has two PCI interfaces, the primary and secondary. Each interface is capable of either master or target operation. The bridge functions as a target on the initiating bus on behalf of the target that actually resides on the target bus. Likewise, the bridge functions as a master on the target bus on behalf of the master that actually resides on the initiating bus.

FIG. 4 illustrates two typical applications for a PCI to PCI bridge. A PCI to PCI bridge allows transactions between a master on one PCI interface to a target on the other interface as illustrated in FIG. 5.

Background: PCI Clock Run

The PCI clock run protocol defines a standard for dynamically reducing the PCI clock to reduce power consumption. In the PCI Specification, it is stated that all components (with a few exceptions) must work with frequencies up to 33 Mhz. When the system stops the clock it must be stopped in the low state and the clock line must remain low until the clock is restarted.

FIG. 6 shows the conventional agent roles in the clocking architecture. In this figure, the central resource (clock controller logic) controls modulation of the PCI clock and monitors and drives the CLKRUN# (more fully described below) to implement the clocking protocol. The master is any PCI master device which comprehends the clock control protocol and uses the CLKRUN# line to request a clock running state in order to assert REQ# and receive ownership of the bus. The target is any PCI target device which may require PCI clocks beyond the 4 clocks guaranteed at the end of a transfer cycle. It uses the CLKRUN# line to request that the clock remain running for a period of time.

Background: PCI CLKRUN# Signal

The CLKRUN# signal is optional and is defined for portable (mobile) computer systems. The PCI specification states that the clock may be stopped or its frequency changed, it does not define a method for determining when to stop or slow down the clock. The PCI specification also fails to define a method for determining when to restart the clock.

Conventional portable systems include a central resource that includes the PCI clock generation logic. CLKRUN# is a sustained tri-state input/output signal which the clock controlling logic keeps asserted when the clock is running normally. When the clock has been stopped or slowed, the clock controlling logic monitors CLKRUN# to recognize requests from devices for a change to be made in the state of the PCI clock signal. The clock cannot be stopped if the bus is not idle.

Before stopping or slowing down the clock frequency, the clock control logic deasserts CLKRUN# for one clock to signal an impending change in the clock state. CLKRUN# is first driven high (deasserted) for one clock, then the clock control logic tri-states the CLKRUN# output driver. The keeper resistor on CLKRUN# then maintains the deasserted state of CLKRUN# during the time the clock is stopped or slowed.

The clock will continue to run unchanged for a minimum of four clocks after the de-assertion of CLKRUN#. After CLKRUN# deassertion, the clock control logic must monitor CLKRUN# for two possible cases:

1. When the clock generation logic has deasserted CLKRUN#, indicating its intention to stop (or slow) the clock, the clock must continue to run for a minimum of four clocks. During this period of time, a device which requires continued clock operation may reassert CLKRUN# for two PCI clock cycles to request continued generation of CLK. When the clock control logic senses that CLKRUN# is reasserted, it reasserts CLKRUN# and continues to generate the clock, instead of slowing or stopping it. The PCI Specification does not define the period of time that the clock should continue to run after a request for continued operation.

2. After the clock has been stopped or slowed, a target may require clock restart in order to request use of the bus. Prior to bus activity, the target must first request clock restart. This is accomplished by assertion of CLKRUN#. When the clock control logic detects the assertion of CLKRUN# by another device, it turns on (or speeds up) the clock and turns on its CLKRUN# output driver to assert CLKRUN#. When the target device detects that CLKRUN# has been asserted for two rising-edges of the PCI CLK signal, the master may then tri-state its CLKRUN# output driver.

Background: PCI Bridge Clock Run

PCI Clock Run is described in the PCI Mobile Design Guide. FIG. 7 shows a typical bridge CLKRUN# routing, in which PCR# is the primary bus CLKRUN#, SCR# is the secondary bus CLKRUN#, PEN is the primary bus enable for the CLKRUN# driver, and SEN is the secondary bus enable for the CLKRUN# driver.

When using the clock run protocol in an architecture with multiple busses and bridges, the routing of the clock and the relationship of the frequencies between the multiple busses must be considered. In general, the bridge itself contains the clocking resources for the secondary bus, but not the primary bus. The bridge does not drive CLKRUN# high on the primary bus, i.e. it does not act as a central resource for the primary bus. The bridge does drive CLKRUN# high on the secondary bus to indicate request to stop/slow the clock.

Note that a PCI device implementing clock run has an additional requirement when considering when to restart the clock. The bridge still has the first two defined above: clock run protocol and a clock restart. In addition to these, the bridge now must recognize when a superior bus transaction is being targeted to a device on the bridge's bus. When the transaction is detected, the clock must be restarted, and then the transaction passed through the bridge to the targeted bus.

Innovative Power Savings System and Method

Previous methods required implementing a PCI to PCI Bridge to enable performing clock run. This resulted in increased cost, complexity of hardware, complexity of software in enumerating all the sub-buses and devices. The innovative circuit, in its preferred embodiment, provides the power savings of Mobile PCI Clock run without the overhead, cost and complexity of a PCI to PCI bridge. This is accomplished, in the preferred embodiment, by supplying a clock run controller, which sits between the upstream PCI bus and a downstream PCI device, monitors traffic on the bus to determine if the PCI device is being actively accessed. If not, the clock to the PCI device is controlled according to the clock run protocol.

Advantages of the preferred embodiment include:

A simplified software enumeration tree over known methods.

Providing clock run protocol power management without implementing a PCI to PCI bridge Through capturing the target PCI device's BAR configuration provides a clock run controller that can be applied to many PCI devices.

BRIEF DESCRIPTION OF THE DRAWINGS

The disclosed inventions will be described with reference to the accompanying drawings, which show important sample embodiments of the invention and which are incorporated in the specification hereof by reference, wherein.

DETAILED DESCRIPTION OF THE PREFERRED EMBODIMENTS

The numerous innovative teachings of the present application will be described with particular reference to the presently preferred embodiment. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
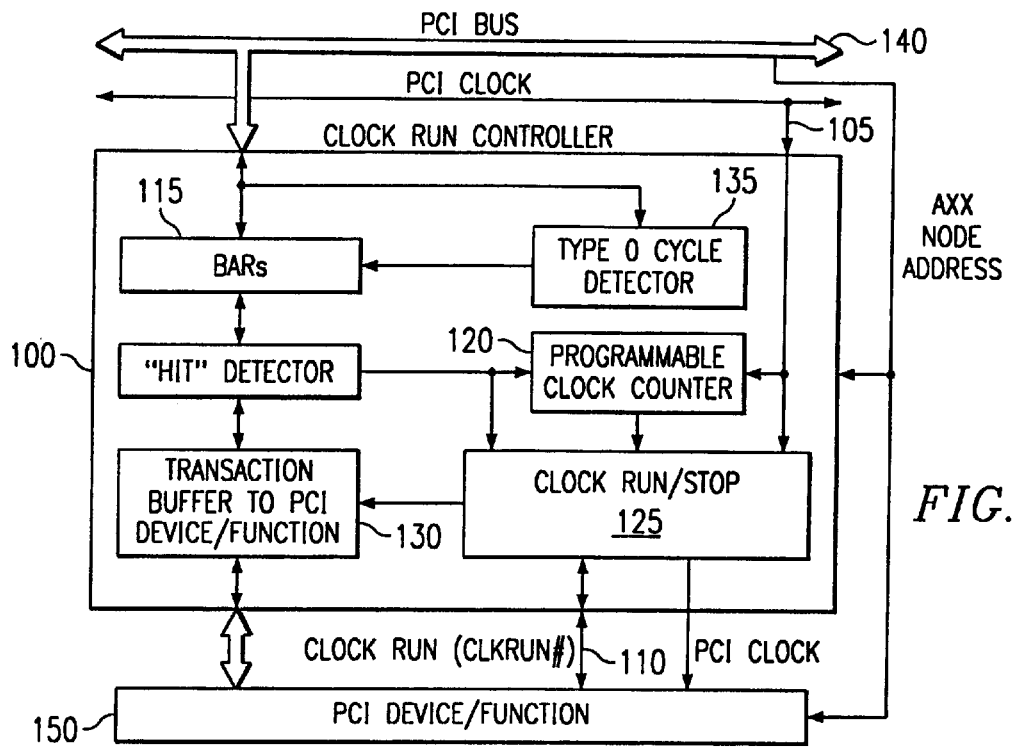
FIG. 1 shows a block diagram of a clock run controller according to the presently preferred embodiment.
Figure 2:
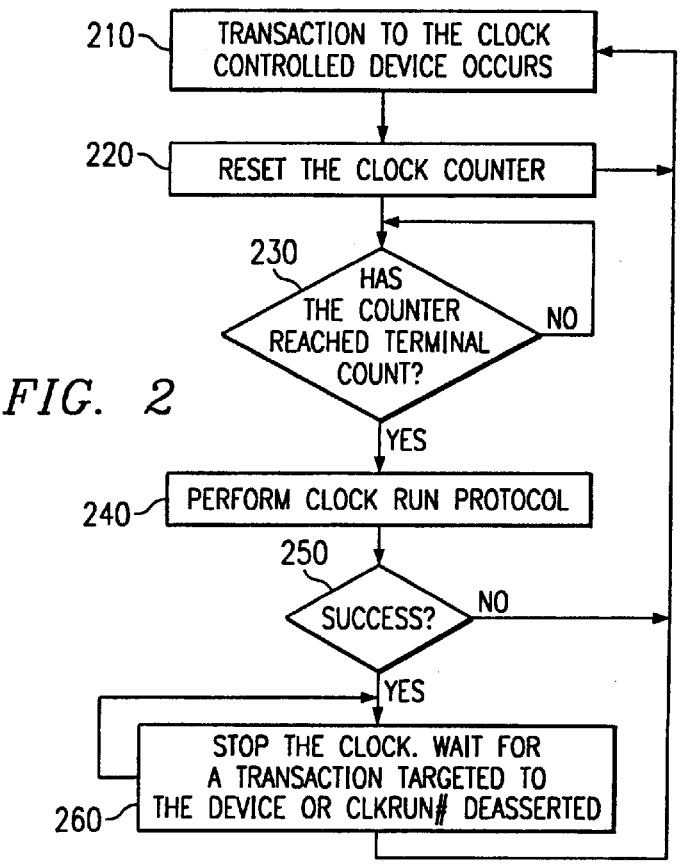
FIG. 2 shows a flowchart of the process of the presently preferred embodiment.

The preferred embodiment is a clock run controller which is transparent to the hardware and software, yet allows the clock run protocol to be used. A block diagram of the preferred embodiment is shown in FIG. 1, connected between PCI bus 140 and PCI device 150. Here, the clock run controller 100 is connected to intercept the PCI clock 105, so it can be slowed or stopped, and is connected to generate the CLKRUN# signal 110 for downstream PCI devices. The clock run controller requires the following subsystems;

1. Base address registers 115 as found in PCI device and function configuration space;
2. Programmable clock counter 120;
3. Clock start/stop circuit 125;
4. Transaction buffer 130; and
5. PCI Type 0 (and optionally Type 1) cycle detection circuits 135.

In the disclosed clock run controller, the master is any device that has the capability to stop the clock to another bus or device, can detect periods of inactivity, and has implemented the clock run protocol. The target, in this context, is any device or bus under a master/controller or one that does not have the capability to stop the clock. A device can function both as a master and a target; for example, a P2P bridge can master its sub-bus and be a target of a bridge over it.

The preferred embodiment requires the clock run controller to shadow into the clock run controller Base Address Registers (BARs) PCI Type 0 configuration cycles that determine the resources required of the sub-bus device. This is done so that the clock run controller can detect "hits" to the PCI device or function under it. "Hits," or accesses to the PCI device, reset the clock counter and prevent the clock run protocol from being asserted. A "hit" also requires the clock run controller to restart the clock to the PCI device or function under it if the clock has been stopped.

The PCI Type 0 cycle detection capability is required to detect configuration, or assignment of I/O or memory resources used in configuring the PCI device or function under the controller. The clock run controller must shadow these configuration cycles so that it can program the BARs.

A PCI device which has its clock stopped can use a transaction buffer in the clock run controller to queue accesses to the device while the clock run controller restarts the clock. In the preferred embodiment, this function is accomplished by having the clock controller cause a retry on the upstream bus. Before the retry can occur, the clock controller can restart the clock to the targeted device, which ensures that the next transaction will succeed. This approach is simpler in that no buffer circuitry is required, since by forcing a retry the need to queue buffer accesses is eliminated.

In order to make the clock run controller appear transparent, the controller must share the same PCI node address as the PCI device being managed by the clock controller. This ensures that the clock run controller can monitor the PCI configuration cycles to the device's PCI configuration space as it is assigned system resources.

PCI configuration cycles requiring reads from the configuration space are unaffected by the clock run controller. Any data required from the PCI device's configuration space must be supplied by the PCI device and not the clock run controller.

The programmable clock counter is used to detect periods of inactivity to determine when the PCI device is idle. Being programmable allows power management to be tuned for optimum power management profiles. After "X" clocks of inactivity, assert clock run protocol.

Finally, if the clock can be restarted within two clocks of a device resource "hit," minimum buffering is required, latency is decreased, and the probability of causing a PCI retry is minimized.

According to an alternate embodiment, a PCI bus Type 1 cycle detection capability is included to enable the clock run controller to detect and support multiple PCI devices under a second bridge.

It is important to note some significant differences between the disclosed clock run controller and a PCI bridge. One particular feature of the preferred embodiment is that the clock run controller shares the node address of the PCI device it manages.

Take, for example, a typical PCI bridge application, in which PCI devices A and B are downstream of PCI bridge C, which is connected to a PCI bus. Device A is assigned, e.g., I/O resources of 0200h–0300h, 10F0h–10FFh, and memory resources of 1000h–2000h. Device B is assigned, e.g., I/O resources of 0090h–0180h, and memory resources of 3000h–4000h. The PCI to PCI bridge, device C, which must claim accesses for both downstream devices, would then be assigned I/O resources of, e.g., 0090h–300h (which may be assigned as two I/O register values of 0090h–0180h and 0200h–0200h), 10F0h–10FFh, and memory resources of 1000h–4000h.

In a system according to the preferred embodiment, however, suppose PCI device X is downstream of clock run controller Y, which is attached to a PCI bus. In this embodiment, PCI device X is assigned, e.g., I/O resources of 0090h–0180h and memory resources of 1000h–2000h. This is down by writing PCI Type 0 cycles to the configuration registers in device X's PCI Configuration Space, which is selected by asserting the node address. As this is done, this write is also shadowed by the clock run controller Y. Clock run controller Y now know what resources it must monitor for activity in order to determine whether or not it can stop the clock or restart the clock (according to the clock run protocol). Thus, by sharing the node address of the downstream devices, and shadowing writes to the Base Address Registers of the target device, the controller can monitor the activity of the downstream device in a manner invisible to the host system. According to this embodiment, clock run controller Y is undetectable to application software.

Figure 3:
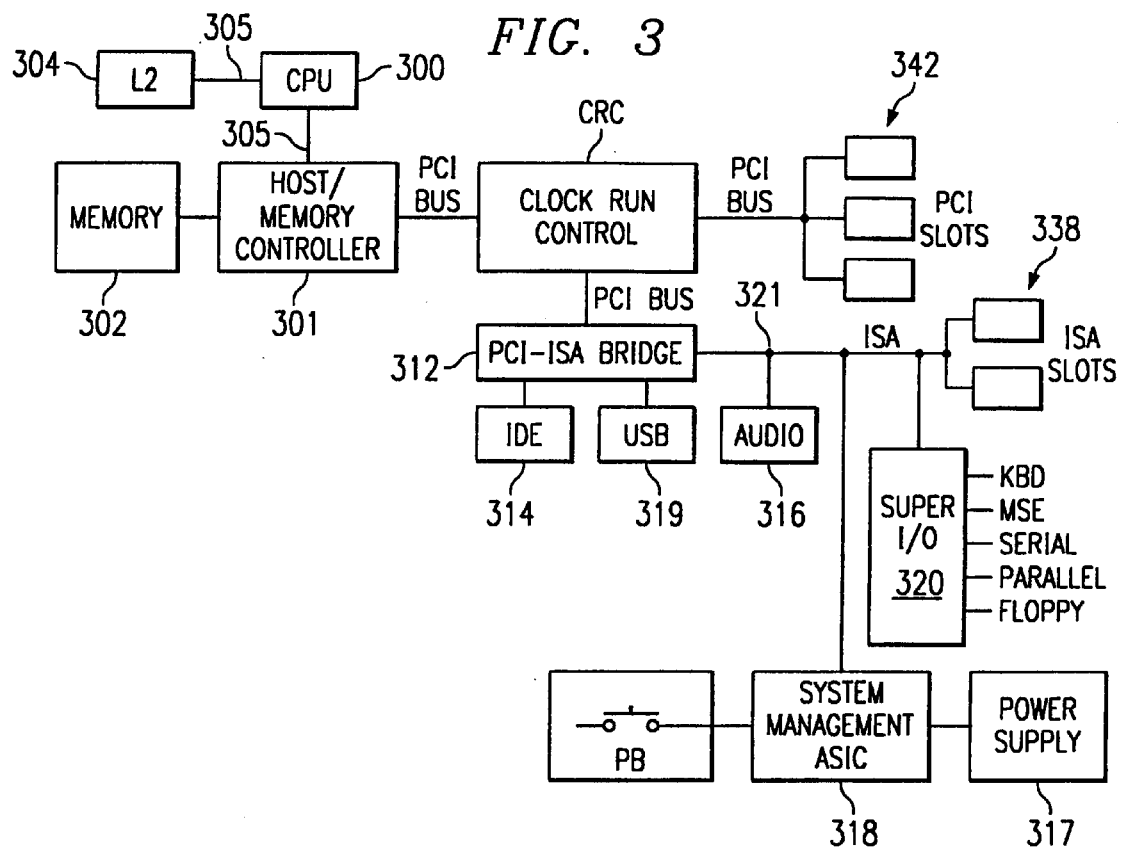
FIG. 3 shows a block diagram of a portable computer system according to the presently preferred embodiment.
Figure 4:
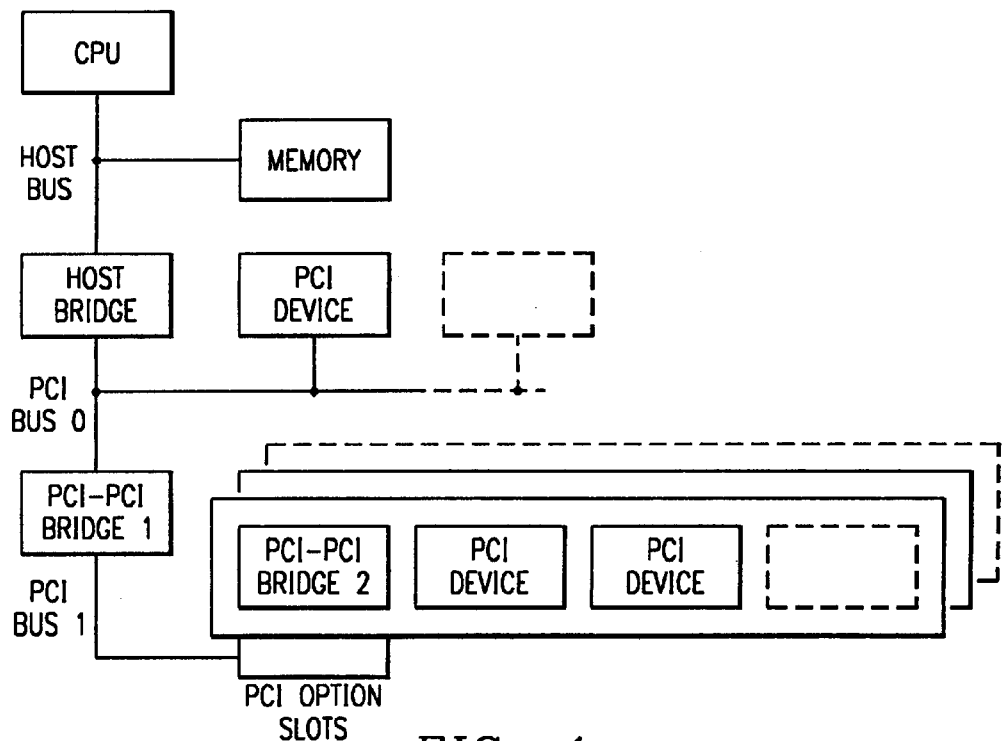
FIG. 4, described above, shows a typical application for a PCI bridge.
Figure 5:
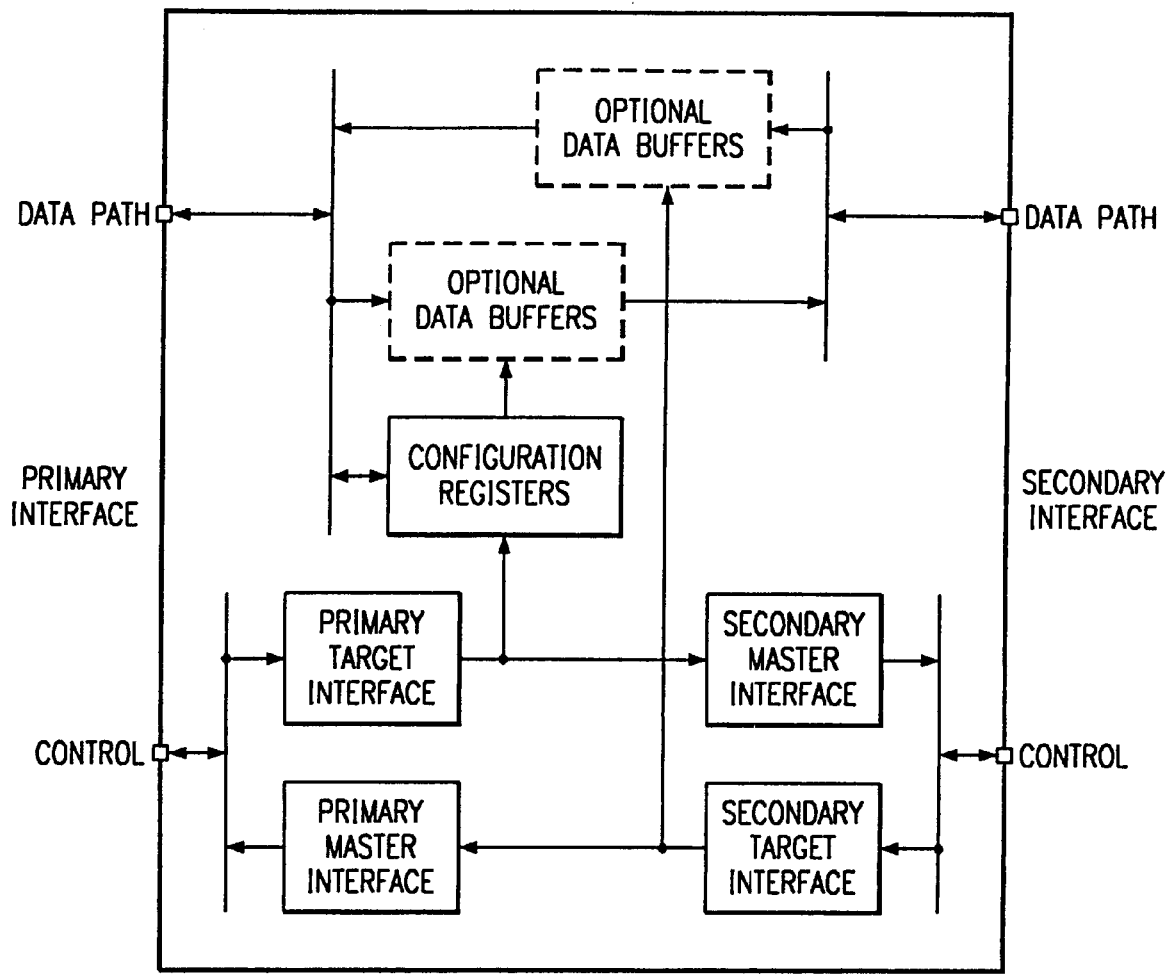
FIG. 5 shows a block diagram of a typical PCI bridge.
Figure 6:
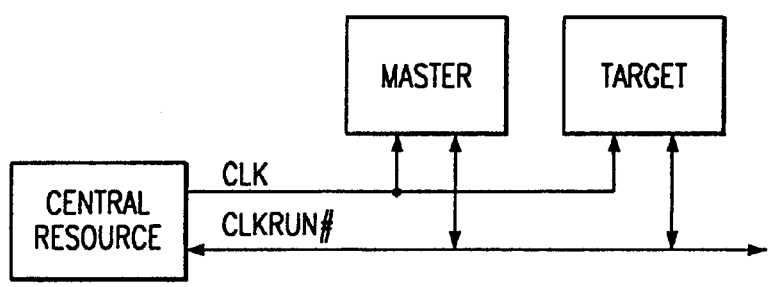
FIG. 6 shows a diagram of conventional agent roles in PCI clocking architecture.

FIG. 3 shows a block diagram of a computer system according to the presently preferred embodiment. The complete computer system includes, in this example:

A CPU 300 and a level two (L2) cache 304, which are connected to a high speed local bus 305. The processor 300 of the preferred embodiment is one of the 80×86 microprocessor family manufactured by Intel Corporation of Santa Clara, Calif. In the preferred embodiment, the processor operates with a standard IBM-PC compatible operating system, such as MS-DOS or Windows, available from Microsoft Corporation of Redmond, Washington. The L2 cache 304 provides additional caching capabilities to the processor's on-chip cache to improve performance.

In addition to the CPU 300 and cache 304, a host/memory controller 301 is connected between the local bus 305 and a PCI bus 306. This host/memory controller is also connected to memory unit 302. The PCI bus 306 is connected to a Clock Run Controller (CRC), according to the preferred embodiment and described in detail above. Downstream from clock run controller CRC are PCI busses (with clock run control) connected to PCI slots 341 and also connected to a PCI/ISA bridge 312, which also provides various support functions to the system, and preferably the PCI/ISA bridge 312 is a single integrated circuit that acts as a PCI bus master and slave, an ISA bus controller, an ISA write posting buffer, an ISA bus arbiter, DMA devices, and an IDE disk controller. The PCI/ISA bridge 312 is connected to an IDE interface 314 and a Universal Serial Bus (USB) 319. The PCI/ISA bridge 312 is also connected to an audio board 316 as conventionally present in PC systems to provide sound communication capabilities for the system via a first ISA interface 321. The IDE interface 314 of the PCI/ISA bridge 312 drives one or more hard disk drives, preferably a CD-ROM player and a disk drive.

The PCI/ISA bridge 312 is connected to an I/O chip 320. The I/O chip 320 provides support for a parallel port, a serial port, a keyboard interface and a mouse interface, among others, for the computer system.

A system management ASIC 318 is operatively connected to I/O chip 312, and is also operatively connected to power button PB and power supply 317.

The PCI bus 307 is also connected to PCI slots 342. The plurality of IDE interfaces 314 on PCI/ISA bridge 312 provide the capability to expand the data storage capability of the system.

Further details of the system context, and of options for implementation, may be found in the books from MindShare, Inc., entitled PROTECTED MODE SOFTWARE ARCHITECTURE (1996), CARDBUS SYSTEM ARCHITECTURE (2.ed. 1996), EISA SYSTEM ARCHITECTURE (2.ed.), ISA SYSTEM ARCHITECTURE (3.ed.), 80486 SYSTEM ARCHITECTURE (3.ed.), PENTIUM PROCESSOR SYSTEM ARCHITECTURE (2.ed.), PCMCIA SYSTEM ARCHITECTURE (2.ed. 1995), PLUG AND PLAY SYSTEM ARCHITECTURE (1995), PCI SYSTEM ARCHITECTURE (3.ed. 1995), USB SYSTEM ARCHITECTURE (1997), and PENTIUM PRO PROCESSOR SYSTEM ARCHITECTURE (1.ed. 1997, 2.ed. 1997), all of which are hereby incorporated by reference, and in the PENTIUM PROCESSOR FAMILY DEVELOPER'S MANUAL 1997, the MULTIPROCESSOR SPECIFICATION (1997), the INTEL ARCHITECTURE OPTIMIZATIONS MANUAL, the INTEL ARCHTECTURE SOFTWARE DEVELOPER'S MANUAL, the PERIPHERAL COMPONENTS 1996 databook, the PENTIUM PRO PROCESSOR BIOS WRITER'S GUIDE (version 2.0, 1996), and the PENTIUM PRO FAMILY DEVELOPER'S MANUALS from Intel, all of which are hereby incorporated by reference.

According to a disclosed class of innovative embodiments, there is provided a computer system, comprising: a user input device, a microprocessor which is operatively connected to detect inputs from said input device, random-access memory which is connected to be read/write accessible by said microprocessor, and an output device operatively connected to receive outputs from said microprocessor; a power supply connected to provide power to said microprocessor and said memory; a system bus operating on a first bus clock; a bus controller connected between said system bus and a second bus, connected to intercept said bus clock and to provide a second bus clock; at least one device connected to said second bus; wherein said bus controller is connected to determine when said device is not being actively used, and to stop said second bus clock until said device is activated.

According to another disclosed class of innovative embodiments, there is provided a computer system, comprising: a user input device, a microprocessor which is operatively connected to detect inputs from said input device, random-access memory which is connected to be read/write accessible by said microprocessor, and an output device operatively connected to receive outputs from said microprocessor; a power supply connected to provide power to said microprocessor and said memory; a PCI bus operating on a first bus clock; a bus controller connected between said PCI bus and at least one PCI sub-bus, connected to intercept said bus clock and to regulate the clock signal on said sub-bus according to a clock-run protocol; at least one PCI device connected to said second bus, and having PCI-compatible addressing; wherein said bus controller is connected to determine when said device is not being actively used, and to stop said second bus clock until said device is activated; wherein said bus controller comprises bus address registers containing addresses corresponding to said PCI-compatible addressing of each of said devices.

According to another disclosed class of innovative embodiments, there is provided a computer system, comprising: at least one input device and at least one output device; a main system module which does not include said input and output devices, and which includes therein: at least one microprocessor which is operatively connected to detect inputs from said input device and to send data to said output device, and random-access memory which is connected to be read/write accessible by said microprocessor; a bus connected to said main system module, and having connections through which additional modules can communicate with said main system module; and a bus controller connected to said bus, connected regulate the clock signal passed on said bus; wherein said bus controller is connected to determine when said device is not being actively used, and to stop said clock signal until said device is activated.

According to another disclosed class of innovative embodiments, there is provided a method, comprising the steps of: monitoring a bus on a computer system; passing data and control signals between said bus and a sub-bus; detecting when a device on said sub-bus is not being used, and thereafter halting at least one control signal to said sub-bus; detecting when said device is activated, and thereafter resuming said passing of said control signal to said subbus.

Modifications and Variations

As will be recognized by those skilled in the art, the innovative concepts described in the present application can be modified and varied over a tremendous range of applications, and accordingly the scope of patented subject matter is not limited by any of the specific exemplary teachings given.

Of course, in implementing power supply circuits and systems, safety is a very high priority. Those of ordinary skill in the art will therefore recognize the necessity to review safety issues carefully, and to make any changes in components or in circuit configuration which may be necessary to improve safety or to meet safety standards in various countries.

In the sample computer system embodiment the user input devices can alternatively include a trackball, a joystick, a 3D position sensor, voice recognition inputs, or other inputs. Similarly, the output devices can optionally include speakers, a display (or merely a display driver), a modem, or other outputs.

What is claimed is:

1. A computer system, comprising:
   a user input device, a microprocessor which is operatively connected to detect inputs from said input device, random-access memory which is connected to be read/write accessible by said microprocessor, and an output device operatively connected to receive outputs from said microprocessor;
   a power supply connected to provide power to said microprocessor and said memory;
   a system bus operating on a first bus clock;
   a bus controller connected between said system bus and a second bus, connected to intercept said bus clock and to provide a second bus clock;
   at least one device connected to said second bus;
   wherein said bus controller is connected to determine when said device is not being actively used, and to stop said second bus clock until said device is activated.

2. The system of claim 1, wherein said bus controller operates according to the clock run protocol.

3. The system of claim 1, wherein said bus is a PCI bus.

4. The system of claim 1, wherein said controller comprises a counter to determine when said device is inactive.

5. The system of claim 1, wherein said controller comprises addressing circuits capable of detecting accesses to said device.

6. A computer system, comprising:
   a user input device, a microprocessor which is operatively connected to detect inputs from said input device, random-access memory which is connected to be read/write accesssible by said microprocessor, and an output device operatively connected to receive outputs from said microprocessor;
   a power supply connected to provide power to said microprocessor and said memory;
   a PCI bus operating on a first bus clock;
   a bus controller connected between said PCI bus and at least one PCI sub-bus, connected to intercept said bus clock and to regulate the clock signal on said sub-bus according to a clock-run protocol;
   at least one PCI device connected to said second bus, and having PCI-compatible addressing;
   wherein said bus controller is connected to determine when said device is not being actively used, and to stop said second bus clock until said device is activated;
   wherein said bus controller comprises bus address registers containing addresses corresponding to said PCI-compatible addressing of each of said devices.

7. The system of claim 5, wherein said bus controller operates according to the clock run protocol.

8. The system of claim 5, wherein said controller comprises a counter to determine when said device is inactive.

9. The system of claim 5, wherein said bus address registers detect when said device is accessed.

10. A computer system, comprising:
    at least one input device and at least one output device;
    a main system module which does not include said input and output devices, and which includes therein: at least one microprocessor which is operatively connected to detect inputs from said input device and to send data to said output device, and random-access memory which is connected to be read/write accessible by said microprocessor;
    a bus connected to said main system module, and having connections through which additional modules can communicate with said main system module; and a bus controller connected to said bus, connected regulate the clock signal passed on said bus;

wherein said bus controller is connected to determine when said device is not being actively used, and to stop said clock signal until said device is activated.

11. The system of claim 10, wherein said bus controller operates according to the clock run protocol.

12. The system of claim 10, wherein said bus is a PCI bus.

13. The system of claim 10, wherein said controller comprises a counter to determine when said device is inactive.

14. The system of claim 10, wherein said controller comprises addressing circuits capable of detecting calls to said device.

15. A method, comprising the steps of:

(a.) monitoring a bus on a computer system;

(b.) passing data and control signals between said bus and a sub-bus;

(c.) detecting when a device on said sub-bus is not being used, and thereafter halting at least one control signal to said sub-bus;

(d.) detecting when said device is activated, and thereafter resuming said passing of said control signal to said sub-bus.

16. The method of claim 15, wherein said halting step stops a clock signal to said sub-bus.

17. The method of claim 15, wherein during said halting step, a CLKRUN# signal is asserted.

18. The method of claim 15, wherein said bus is a PCI bus.

19. The method of claim 15, further comprising the step of operating a counter to determine when said device is inactive.

20. The method of claim 15, further comprising the step of providing addressing circuits capable of detecting accesses to said device.

* * * * *